(12) United States Patent
Kanou et al.

(10) Patent No.: US 12,258,736 B2
(45) Date of Patent: Mar. 25, 2025

(54) SYSTEM AND METHOD FOR DETERMINING CONSTRUCTION PLAN FOR WORK MACHINE AT CONSTRUCTION SITE

(71) Applicant: KOMATSU LTD., Tokyo (JP)

(72) Inventors: Shinya Kanou, Tokyo (JP); Hiroshi Tadenuma, Tokyo (JP)

(73) Assignee: KOMATSU LTD., Tokyo (JP)

(*) Notice: Subject to any disclaimer, the term of this patent is extended or adjusted under 35 U.S.C. 154(b) by 341 days.

(21) Appl. No.: 17/775,662

(22) PCT Filed: Dec. 14, 2020

(86) PCT No.: PCT/JP2020/046599
§ 371 (c)(1),
(2) Date: May 10, 2022

(87) PCT Pub. No.: WO2021/131864
PCT Pub. Date: Jul. 1, 2021

(65) Prior Publication Data
US 2022/0403627 A1 Dec. 22, 2022

(30) Foreign Application Priority Data
Dec. 24, 2019 (JP) .................. 2019-233066

(51) Int. Cl.
*E02F 9/26* (2006.01)
*G06Q 50/08* (2012.01)

(52) U.S. Cl.
CPC ............. *E02F 9/262* (2013.01); *G06Q 50/08* (2013.01)

(58) Field of Classification Search
CPC ........ E02F 9/262; E02F 9/2045; G06Q 50/08; G06Q 10/0631; G06Q 10/103
See application file for complete search history.

(56) References Cited

U.S. PATENT DOCUMENTS

2018/0245308 A1* 8/2018 Ready-Campbell ........................ G05D 1/0231
2018/0374168 A1* 12/2018 Kano ..................... G06Q 50/08
(Continued)

FOREIGN PATENT DOCUMENTS

CN 109978256 A 7/2019
JP 2019-78730 A 5/2019
(Continued)

OTHER PUBLICATIONS

The Examination report No. 1 for the Australian patent application No. 2020415683, issued on May 1, 2023.
(Continued)

*Primary Examiner* — Kenneth J Malkowski
*Assistant Examiner* — Ibrahim Abdoalatif Alsomairy
(74) *Attorney, Agent, or Firm* — Global IP Counselors, LLP

(57) ABSTRACT

A system includes a region data module and a planning module. The region data module acquires excavation region data and embankment region data. The excavation region data indicates positions of a plurality of excavation regions at a work site. The embankment region data indicates positions of a plurality of embankment regions at the work site. The planning module determines, as a construction plan, a construction sequence and a target travel path including a combination of a plurality of travel paths connecting the excavation regions and the embankment regions while taking into account a change in a topography at the work site.

20 Claims, 15 Drawing Sheets

(56) References Cited

U.S. PATENT DOCUMENTS

| | | | |
|---|---|---|---|
| 2020/0018045 A1* | 1/2020 | Sano | E02F 9/245 |
| 2020/0240111 A1 | 7/2020 | Saiki | |
| 2020/0370277 A1* | 11/2020 | Takaoka | E02F 3/844 |
| 2020/0409377 A1* | 12/2020 | Ready-Campbell | G05D 1/0212 |

FOREIGN PATENT DOCUMENTS

| | | |
|---|---|---|
| JP | 2019-196630 A | 11/2019 |
| WO | 2017/170968 A1 | 10/2017 |

OTHER PUBLICATIONS

Hirayama, M. et al., 'Artificial Intelligence in Path Planning for Autonomous Bulldozers: Comparison With Manual Operation,' International Journal of Innovative Computing, Information and Control ICIC International, vol. 15, No. 3, Jun. 2019, pp. 825-844.
Hirayama, M. et al., 'Path Planning for Autonomous Bulldozers,' Mechatronics, vol. 58, Apr. 2019, pp. 20-38; published online on Jan. 14, 2019. https://doi.org/10.1016/j.mechatronics.2019.01.001.
The International Search Report for the corresponding international application No. PCT/JP2020/046599, issued on Feb. 9, 2021.
The Office Action for the corresponding Chinese application No. 202080078806.6, issued on Jan. 13, 2025.

* cited by examiner

| | F(1,1) | F(1,2) | F(1,3) | F(1,4) | F(1,5) | F(1,6) | F(1,7) | F(1,8) | F(1,9) | F(1,10) | F(1,11) |
|---|---|---|---|---|---|---|---|---|---|---|---|
| F(1,1) | -12.8 | -4.0 | -1.6 | 0.0 | 3.8 | 3.5 | 1.9 | 11.9 | 14.0 | 14.0 | 13.7 |
| F(2,1) | -13.3 | -3.1 | -1.6 | -1.6 | 0.0 | 3.8 | 3.8 | 11.9 | 11.9 | 14.0 | 21.0 |
| F(3,1) | -13.6 | -6.6 | -6.2 | -1.6 | -0.8 | 0.0 | 0.0 | 3.9 | 11.9 | 21.3 | 16.7 |
| F(4,1) | 0.0 | -11.1 | -1.6 | -1.6 | -1.6 | -0.8 | -0.8 | 0.0 | 0.0 | 0.0 | 0.0 |
| F(5,1) | 0.0 | 0.0 | -0.8 | -0.8 | -1.6 | -1.6 | -1.6 | -0.8 | -0.8 | -0.8 | -0.8 |
| F(6,1) | 5.5 | 0.0 | 0.0 | 0.0 | -0.8 | -1.6 | -1.6 | -2.8 | -2.8 | -2.8 | -2.8 |
| F(7,1) | 13.2 | 2.2 | 4.1 | 0.0 | 0.0 | -1.6 | -1.6 | -2.8 | -6.8 | -6.8 | -6.8 |
| F(8,1) | 16.5 | 12.4 | 11.5 | 10.8 | 0.0 | 0.0 | -1.6 | -2.8 | -6.8 | -6.8 | -6.2 |
| F(9,1) | 16.5 | 12.4 | 12.4 | 12.4 | 7.5 | 0.0 | -1.3 | -2.8 | -6.8 | -6.8 | -8.0 |

SYSTEM AND METHOD FOR DETERMINING CONSTRUCTION PLAN FOR WORK MACHINE AT CONSTRUCTION SITE

CROSS-REFERENCE TO RELATED APPLICATIONS

This application is a U.S. National stage application of International Application No. PCT/JP2020/046599, filed on Dec. 14, 2020. This U.S. National stage application claims priority under 35 U.S.C. § 119(a) to Japanese Patent Application No. 2019-233066, filed in Japan on Dec. 24, 2019, the entire contents of which are hereby incorporated herein by reference.

BACKGROUND

Technical Field

The present invention relates to a system and a method for determining a construction plan for a work machine at a construction site.

Background Information

At a certain type of construction site, construction work is carried out for transporting soil excavated from an excavation region with a work machine and placing the soil in an embankment region. For example, WO 2017/170968 discloses a simulation system for improving productivity for this type of construction. The simulation system of WO 2017/170968 acquires construction amount data that indicates a construction amount at a construction site, from the difference between the actual topography and a design topography of the construction site. The simulation system acquires basic unit data which includes the number of work machines and a construction capability. The simulation system acquires construction conditional data which includes a sequence of construction and a travel path of a work machine. The simulation system simulates a construction condition of the construction site and a working condition of the work machine from the construction amount data, the basic unit data, and the construction conditional data.

SUMMARY

In order to improve construction site productivity, how to efficiently transport soil is one important factor. For example, if excavation regions and embankment regions are distributed among a plurality of regions in the construction site, multiple combinations of travel paths that link the excavation regions and the embankment regions could be assumed. In addition, the topography of the construction site changes in response to the progress of the construction. When the topography of the construction site changes, the travel paths that could be selected also change. Therefore, in addition to the combinations of travel paths, the sequence of the construction has a large effect on construction efficiency.

An object of the present disclosure is to provide a system and a method for determining a construction plan with which construction efficiency can be improved by performing a simulation of changes in the travel paths in consideration of changes in the topography accompanying the progress of the construction.

A first aspect of the present disclosure is a system for determining a construction plan of a work machine at a construction site. The system includes a region data module and a planning module. The region data module acquires excavation region data and embankment region data. The excavation region data indicates positions of a plurality of excavation regions at the construction site. The embankment region data indicates positions of a plurality of embankment regions at the construction site. The planning module determines, as a construction plan, a construction sequence and a target travel path including a combination of a plurality of travel paths connecting the excavation regions and the embankment regions while taking into consideration changes in the topography at the construction site.

A second aspect of the present disclosure is a method implemented into a computer for determining a construction plan for a work machine at a construction site. The method includes the following processes. A first process is acquiring excavation region data that indicates positions of a plurality of excavation regions at the construction site. A second process is acquiring embankment region data that indicates positions of a plurality of embankment regions at the construction site. A third process is determining, as a construction plan, a construction sequence and a target travel path including a combination of a plurality of travel paths connecting the excavation regions and the embankment regions while taking into consideration changes in the topography at the construction site. The sequence of the execution of the above processes is not limited to the abovementioned sequence and may be changed.

According to the system and method as in the present disclosure, a suitable construction plan can be determined for improving construction efficiency.

BRIEF DESCRIPTION OF DRAWINGS

FIG. 7 is an enlarged view illustrating a portion of elevation difference data.

FIG. 8 is a view illustrating grouping of element regions.

DESCRIPTION OF EMBODIMENTS

Figure 1:
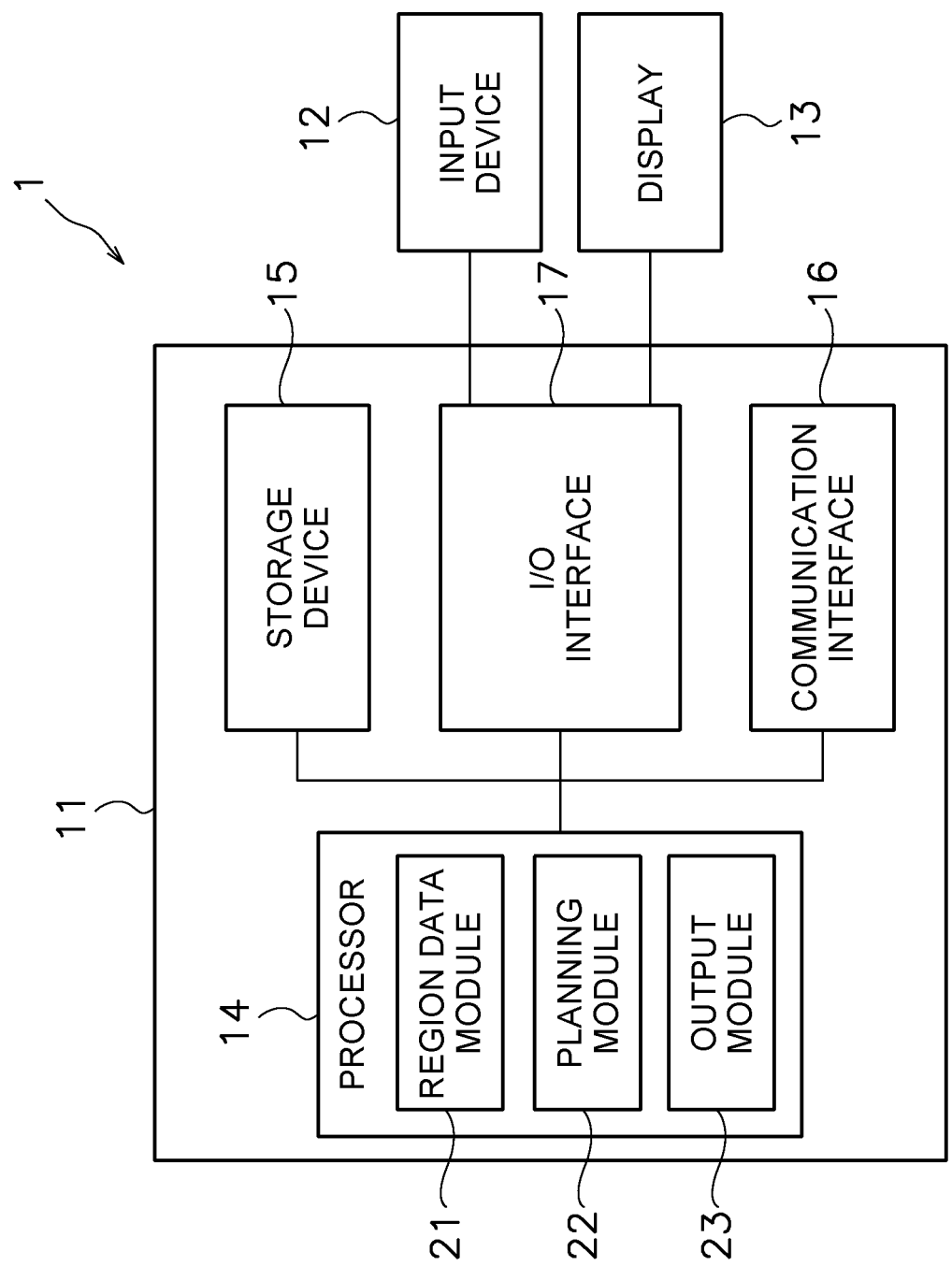
FIG. 1 is a schematic view illustrating a configuration of a system according to an embodiment.

The following is an explanation of an embodiment with reference to the accompanying drawings. FIG. 1 is a schematic view illustrating a configuration of a system 1 according to an embodiment. The system 1 according to the present embodiment is a system for determining a target travel path of a work machine at a construction site. As illustrated in FIG. 1, the system 1 includes a computer 11, an input device 12, and a display 13. The computer 11 includes a processor 14, a storage device 15, a communication interface 16, and an I/O interface 17.

The processor 14 is, for example, a central processing unit (CPU). The processor 14 may also be another processor such as a graphics processing unit (GPU). The storage device 15 includes a medium for recording information, such as recorded programs or data, in a manner that can be read by the processor 14. The storage device 15 includes a system memory, such as a random access memory (RAM) or a read-only memory (ROM), and an auxiliary storage device. The auxiliary storage device may be an electromagnetic recording medium, such as a hard disk, an optical recording medium, such as a CD or a DVD or the like, or a semiconductor memory, such as a flash memory. The storage device 15 may be built into the system 1. The storage device 15 may also include a recording medium that can be detachably connected to the system 1.

The communication interface 16 is, for example, an interface for communicating over a communication network. The communication interface 16 is, for example, a wired local area network (LAN) module or a wireless LAN module. The system 1 transmits data to an external computer over the communication network. The system 1 also receives data from the external computer over the communication network.

The system 1 is connected to the input device 12 and the display 13 through the I/O interface 17. The input device 12 is a device for an operator to make inputs to the system 1. The input device 12 includes, for example, a pointing device such as a mouse or a track ball. The input device 12 may include a device for inputting characters such as a keyboard. The input device 12 may include a touch screen. The input device 12 receives operations from the operator. The input device 12 outputs signals indicating operations inputted by the operator, to the computer 11.

The display 13 is, for example, a liquid crystal display (LCD) or an organic EL display (OELD). The display 13 may be another type of display. The display 13 displays a video in accordance with video signals from the computer 11.

As illustrated in FIG. 1, the system 1 includes a region data module 21, a planning module 22, and an output module 23. The modules 21 to 23 may include programs, algorithms, and data that are executed by the processor 14. The modules 21 to 23 may be realized by a single processor or may be realized by being distributed among a plurality of processors.

Figure 2:
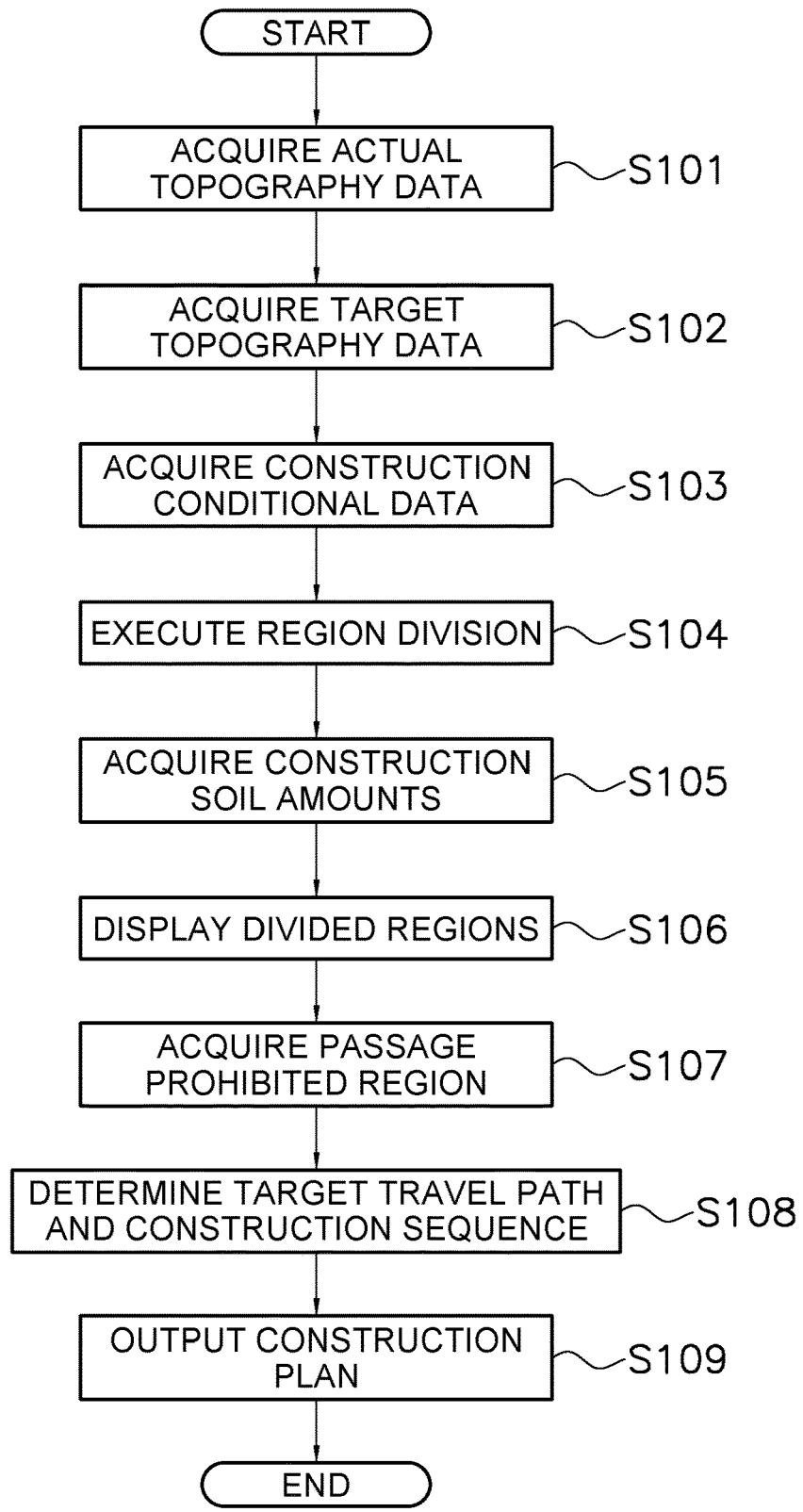
FIG. 2 is a flow chart illustrating a process for determining a target travel path.
Figure 3:
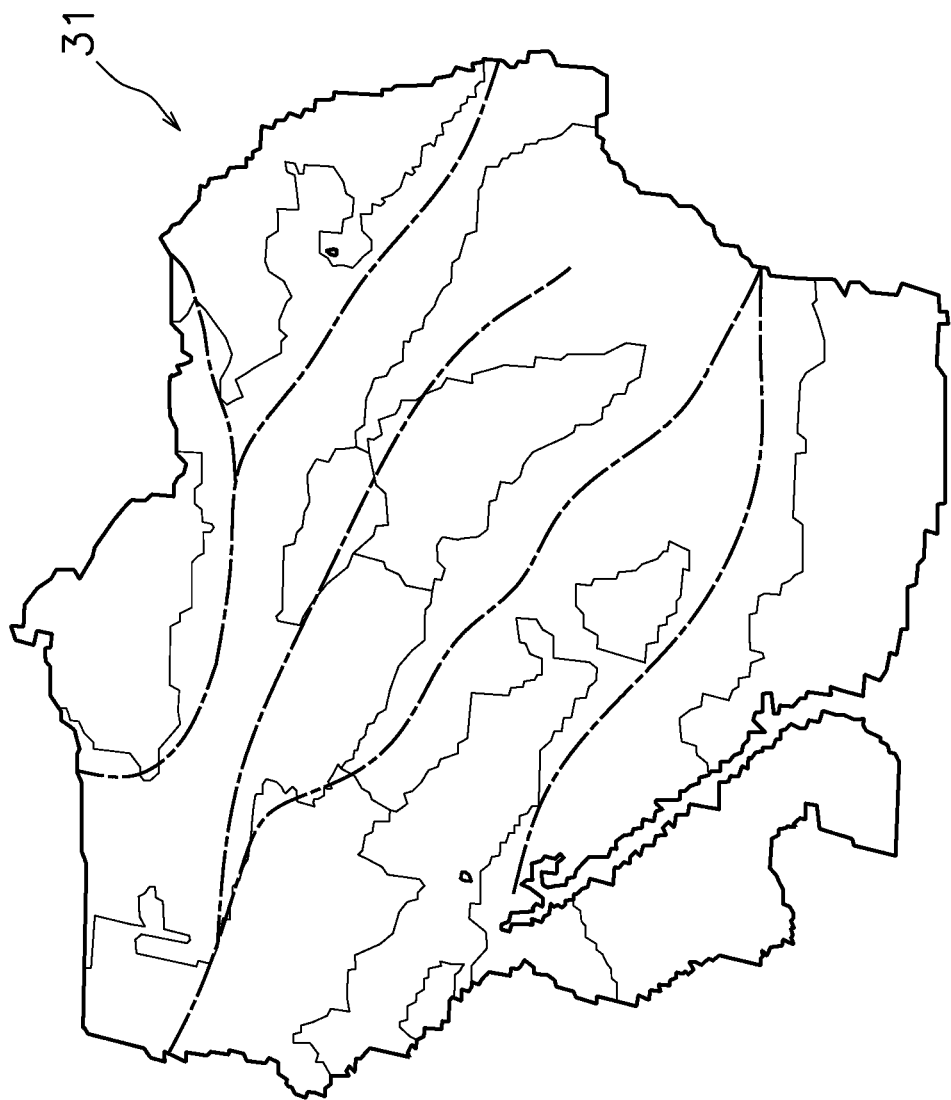
FIG. 3 is a top view illustrating an example of an actual topography.

FIG. 2 is a flow chart illustrating a process executed by the system 1 for determining a construction plan of the work machine. The construction plan of the work machine includes a target travel path and a construction sequence of the work machine. As illustrated in FIG. 2, in step S101, the region data module 21 acquires actual topography data. The actual topography data is three-dimensional survey data which depicts the actual topography of the construction site. The actual topography data includes planar coordinates and heights of points on the actual topography. FIG. 3 is a top view illustrating an example of an actual topography 31.

In step S102, the region data module 21 acquires target topography data. The target topography data is three-dimensional design data which depicts the target topography of the construction site. The target topography data includes planar coordinates and heights of points on the target topography. The actual topography data and the target topography data are, for example, transmitted from an external computer over the communication network to the system 1 and saved in the storage device 15. Alternatively, the actual topography data and the target topography data may be input into the system 1 through a recording medium.

In step S103, the region data module 21 acquires construction conditional data. The construction conditional data includes the number of work machines that can be used during the construction at the construction site, and a construction capacity. The work machines include, for example, bulldozers, hydraulic excavators, or dump trucks. The construction capacity may be, for example, the amount of soil per unit of time that can be excavated by the bulldozers or the hydraulic excavators. The construction capacity may be the blade capacity of the bulldozers or the bucket capacity of the hydraulic excavators. The construction capacity may also be the amount of soil that can be transported by the dump trucks. The construction conditional data is transmitted from an external computer over the communication network to the system 1 and is saved in the storage device 15. Alternatively, the construction conditional data may be input into the system 1 through a recording medium. Alternatively, the construction conditional data may be input by an operator through the input device 12.

Figure 4:
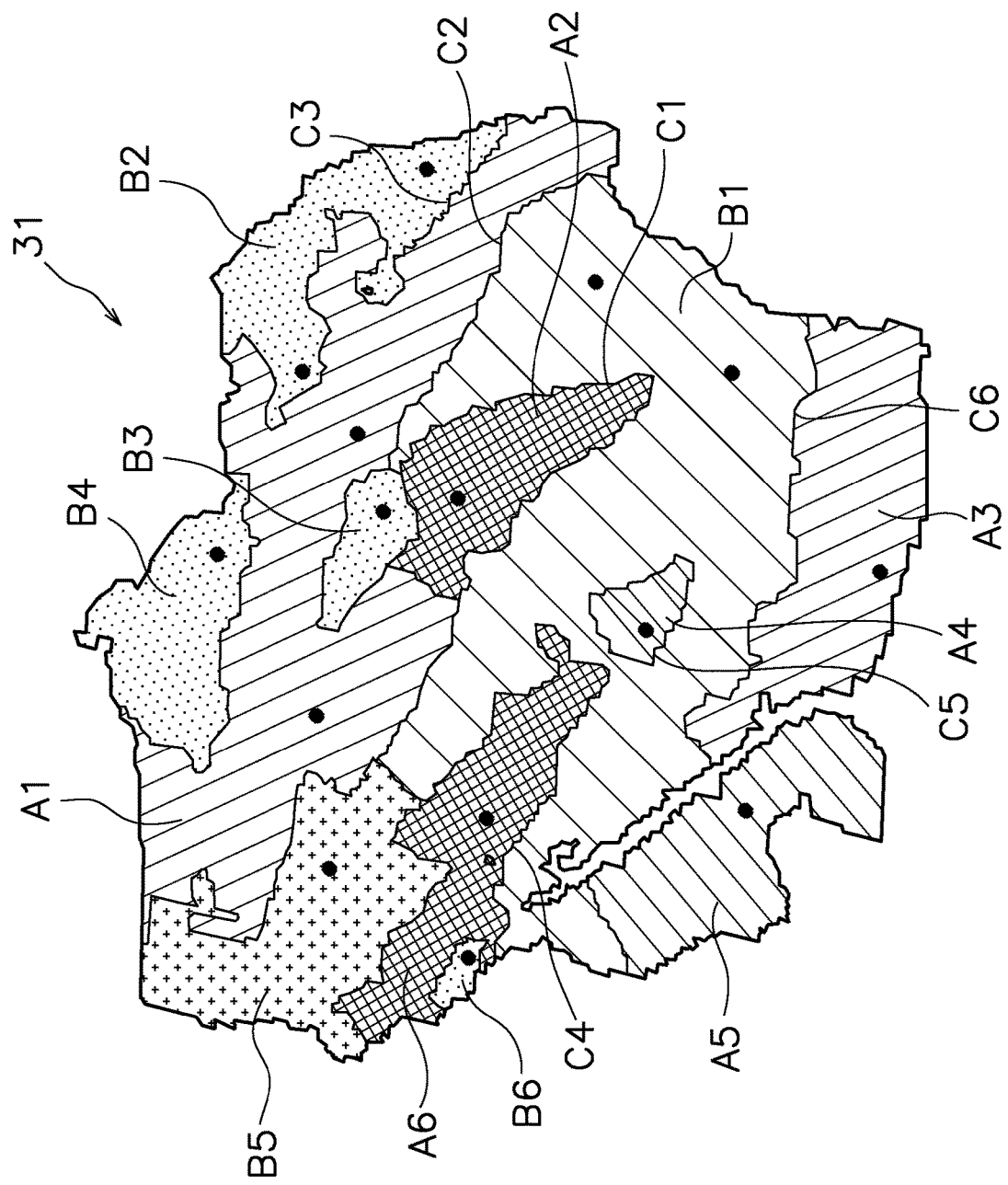
FIG. 4 is a view illustrating an example of the actual topography divided into excavation regions, embankment regions, and border regions.

In step S104, the region data module 21 executes region division. The region data module 21 divides the actual topography 31 into excavation regions, embankment regions, and border regions. The excavation regions are regions where the work machines perform excavation work. During the excavation work, the work machines excavate the actual topography 31. The embankment regions are regions where the work machines perform embankment work. During the embankment work, the work machines place soil on the actual topography 31. FIG. 4 is a top view illustrating an example of the actual topography 31 that has been divided. In the example illustrated in FIG. 4, the actual topography 31 represents the actual topography 31 divided into excavation regions A1 to A6, embankment regions B1 to B6, and border regions C1 to C6.

Figure 5:
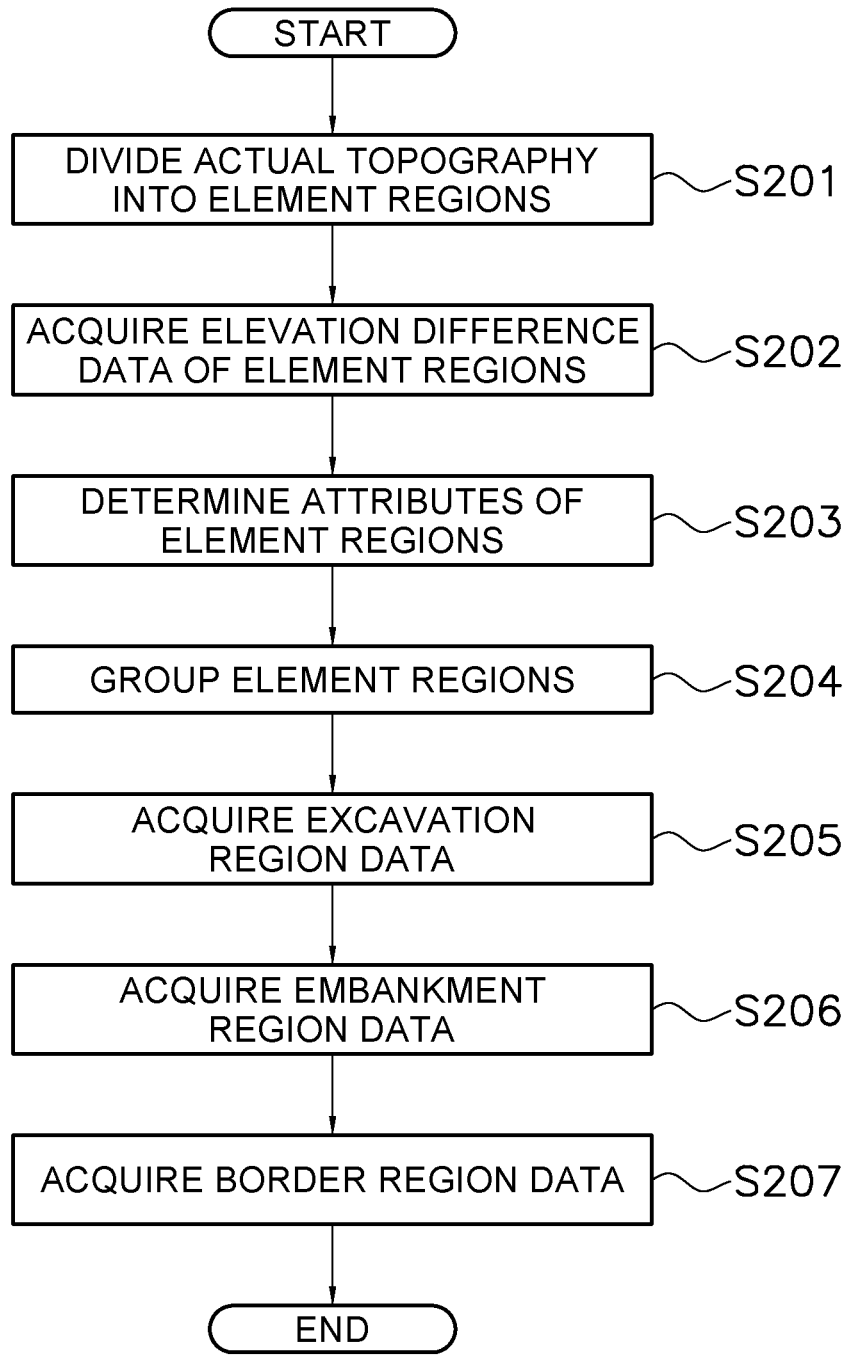
FIG. 5 is a flow chart illustrating a process for region division.

FIG. 5 is a flow chart illustrating a process for region division. As illustrated in FIG. 5, in step S201, the region data module 21 divides the actual topography 31 into a plurality of element regions. An element region has, for example, a square shape. The element regions may have, for example, another shape, such as a triangular shape or a hexagonal shape. The size of the element regions is appropriately determined for region division in advance and saved in the storage device 15.

Figure 6:
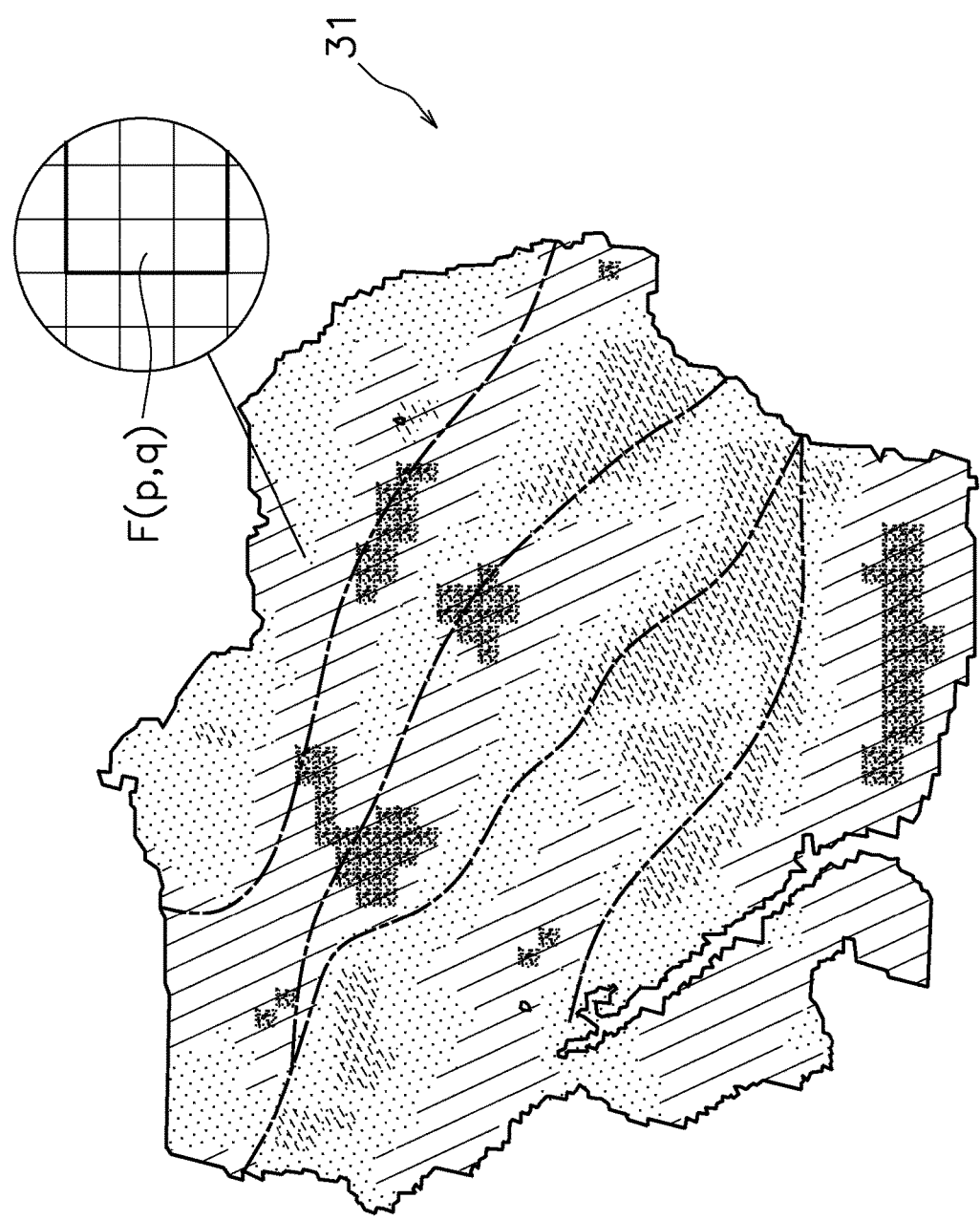
FIG. 6 is a view illustrating an example of the actual topography divided into a plurality of element regions.

FIG. 6 is a view illustrating an example of the actual topography 31 divided into a plurality of element regions. The region data module 21 calculates the height of each element region $F(p,q)$. For example, the region data module 21 calculates an average value of the height of the actual topography 31 inside each element region $F(p,q)$, as the height of the element region $F(p,q)$. Alternatively, the region data module 21 may calculate the height of a random representative point of the actual topography 31 inside teach element region $F(p,q)$ as the height of the element region $F(p,q)$.

In step S202, the region data module 21 acquires elevation difference data of the element regions $F(p,q)$. The elevation difference data indicates the difference between the height of the actual topography 31 and the height of the target topography for each element region $F(p,q)$. FIG. 7 is an enlarged view illustrating a portion of the elevation difference data of element regions F(p,q) (p=1, 2, 3, ..., q=1, 2, 3, ...). In FIG. 7, reference symbols are applied to only a portion of the element regions F(p,q) and are omitted from the other element regions F(p,q).

In FIG. 7, the numerical values applied to the element regions F(p,q) indicate the elevation difference of the element regions F(p,q). A positive value indicates a position where the actual topography 31 is higher than the target topography. A negative value indicates a position where the actual topography 31 is lower than the target topography. Zero indicates that the actual topography 31 has the same height as the target topography. The numerical values indicated in FIG. 7 are merely examples and are not limited thereto.

In step S203, the region data module 21 determines attributes of the element regions F(p,q). The region data module 21 determines an element region F(p,q) where the actual topography 31 is positioned higher than the target topography as an excavation attribute. That is, the region data module 21 determines the attribute of an element region F(p,q) having elevation difference data that is a positive value as an excavation attribute.

The region data module 21 determines an element region F(p,q) where the actual topography 31 is positioned below the target topography as an embankment attribute. That is, the region data module 21 determines the attribute of an element region F(p,q) having elevation difference data that is a negative value as an embankment attribute. The region data module 21 determines an element region F(p,q) where the actual topography 31 is the same height as the target topography as a border attribute. That is, the region data module 21 determines the attribute of an element region F(p,q) having elevation difference data of zero as a border attribute. From the point of view of ease of construction of the excavation machines, an elevation difference that is small enough to be seen as substantially the same height may be considered zero.

In step S204, the region data module 21 groups the element regions F(p,q). Specifically, the region data module 21 forms a group from element regions F(p,q) that are adjacent to each other and have excavation attributes. The region data module 21 forms a group from element regions F(p,q) that are adjacent to each other and have embankment attributes. The region data module 21 forms a group from element regions F(p,q) that are adjacent to each other and have border attributes.

In step S205, the region data module 21 acquires excavation region data. The region data module 21 determines a group of element regions F(p,q) having excavation attributes as an excavation region. The region data module 21 acquires the positions and elevation difference data of the element regions F(p,q) included in the excavation region as the excavation region data. The region data module 21 determines a position of a representative point of an excavation region as the position of the excavation region. The representative point may be the position at the center of the excavation region. Alternatively, the representative point may be set with the input device 12.

In step S206, the region data module 21 acquires embankment region data. The region data module 21 determines a group of element regions F(p,q) having embankment attributes as an embankment region. The region data module 21 acquires the positions and elevation difference data of the element regions F(p,q) included in the embankment region as the embankment region data. The region data module 21 determines a position of a representative point of an embankment region as the position of the embankment region. The representative point may be the position at the center of the embankment region. Alternatively, the representative point may be set with the input device 12.

In step S207, the region data module 21 acquires border region data. The region data module 21 determines a group of element regions F(p,q) having border attributes as a border region. The region data module 21 acquires the positions and elevation difference data of the element regions F(p,q) included in the border region as the border region data.

Figure 8:
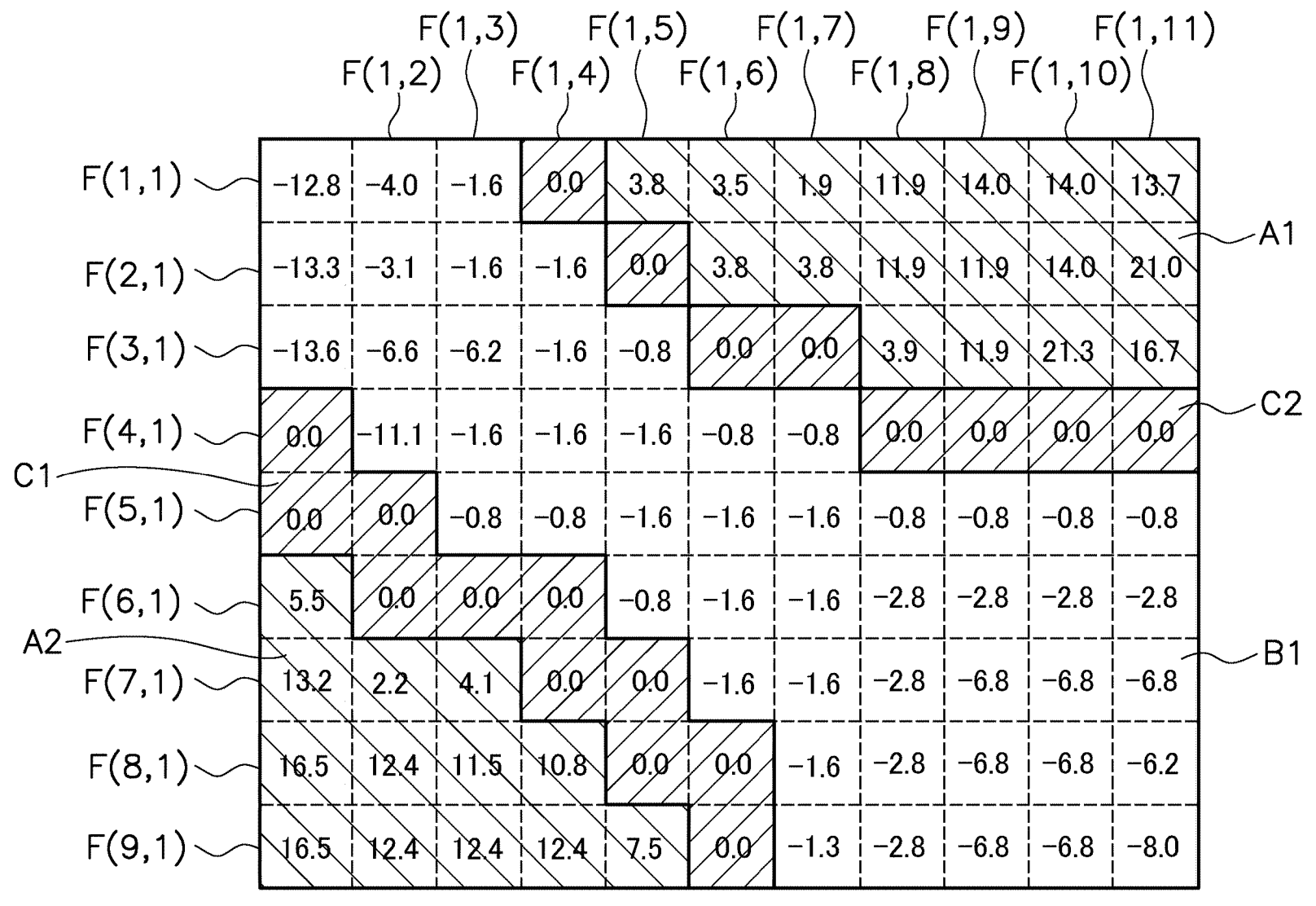

In the example illustrated in FIG. 7, the region data module 21 determines a group of element regions F(p,q) having excavation attributes as illustrated in FIG. 8, as excavation regions A1 and A2. The region data module 21 determines a group of element regions F(p,q) having embankment attributes as embankment region B1. The region data module 21 determines a group of element regions F(p,q) having border attributes as border regions C1 and C2. As a result of the above processing, the actual topography 31 of the construction site is divided into excavation regions A1 to A6, embankment regions, B1 to B6, and border regions C1 to C6 as illustrated in FIG. 4.

Figure 9:
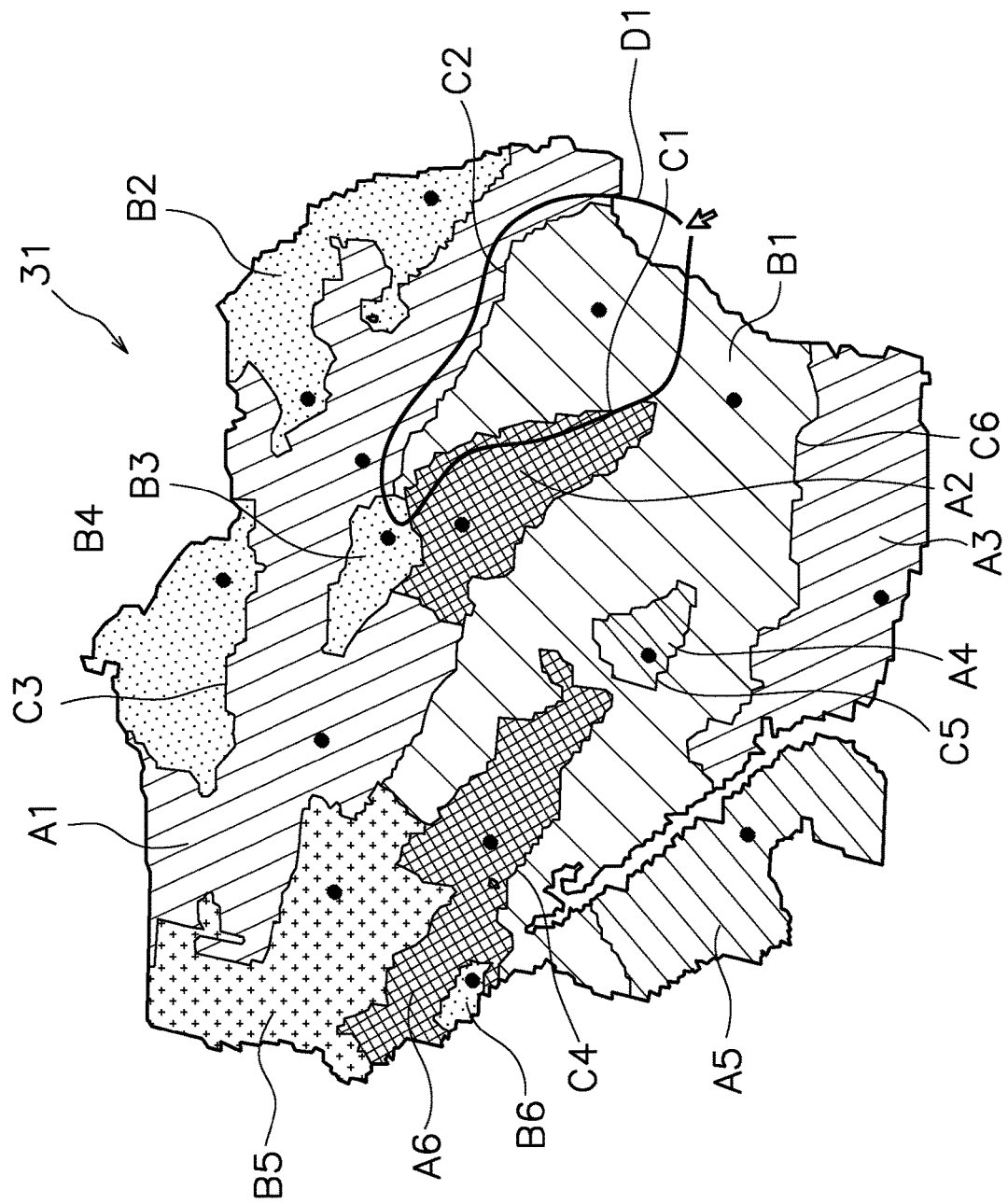
FIG. 9 is a view illustrating regions divided manually.
Figure 10:
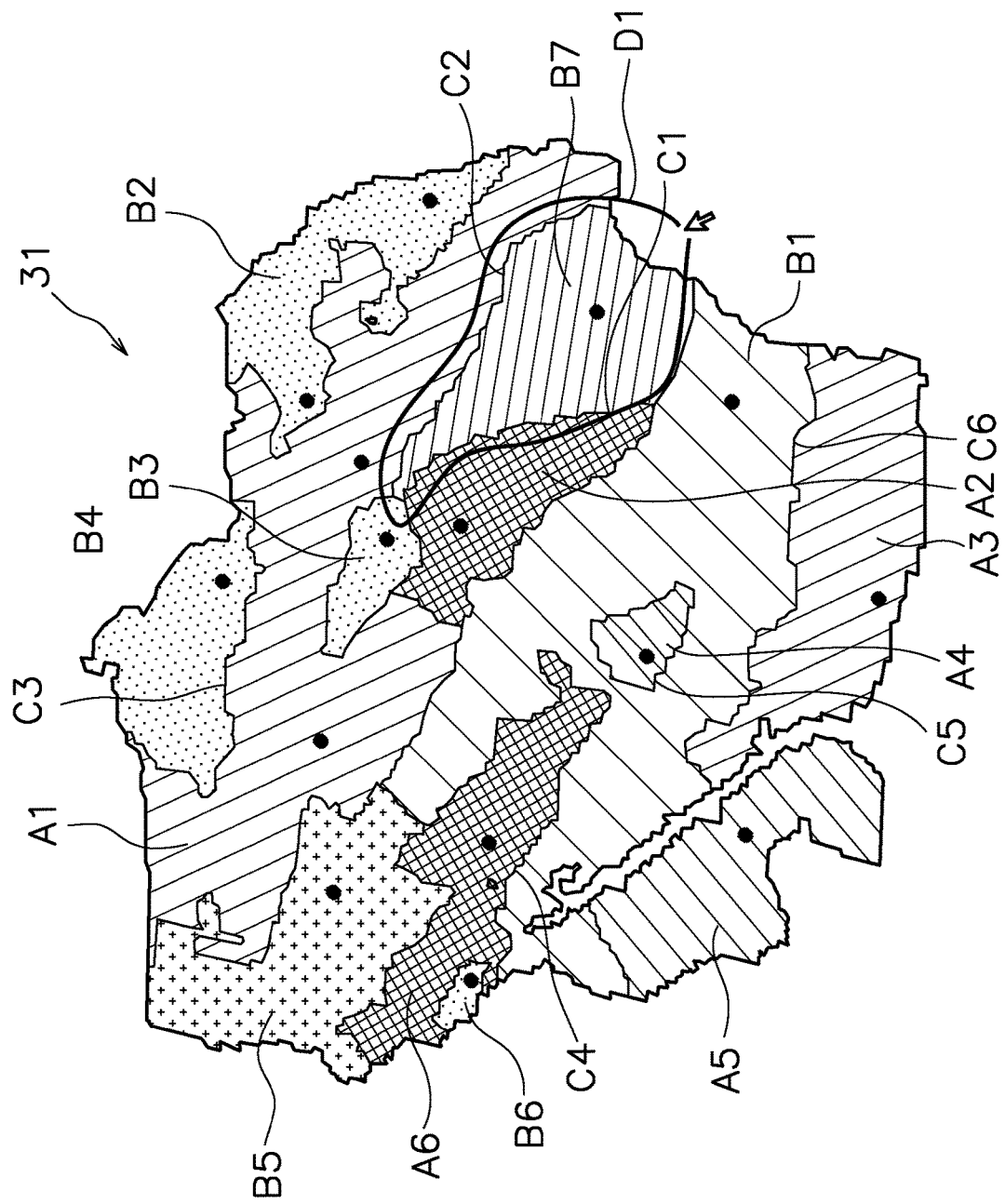
FIG. 10 is a view illustrating regions divided manually.

As illustrated in FIG. 9, a random area D1 of the actual topography 31 may be designated by means of an operation of the input device 12 by the operator. As illustrated in FIG. 10, the region data module 21 may further divide the actual topography 31 inside the designated area D1 as an embankment region B7.

Alternatively, the region data module 21 may further divide the actual topography 31 inside the designated area as an excavation region.

In step S105 in FIG. 2, the region data module 21 acquires construction soil amounts. Specifically, the region data module 21 acquires the construction soil amounts of each excavation region. The construction soil amounts of the excavation regions represent the amount of soil to be excavated by the work machines. The region data module 21 acquires the construction soil amounts of each embankment region. The construction soil amounts of the embankment regions represent the amount of soil to be placed on the actual topography 31 by the work machines. The region data module 21 calculates the construction soil amounts of the excavation regions and the construction soil amounts of the embankment regions from the difference of the volumes between the actual topography 31 and the target topography.

In step S106, the output module 23 displays the divided regions on the display 13. The output module 23 displays the excavation regions, the embankment regions, and the border regions on the actual topography 31 in different colors on the display 13. As a result of the above processing, the actual topography 31 divided into the excavation regions A1 to A6, the embankment regions B1 to B6, and the border regions C1 to C6 is displayed on the display 13 as illustrated in FIG. 4. The output module 23 may also display the regions on the display 13 by adding light and shade in response to the soil amount distribution of each region.

In step S107, the planning module 22 acquires the position of a passage prohibited region. The planning module 22 calculates slopes from the elevation difference between adjacent element regions F(p,q). For example, the planning module 22 determines an element region F(p,q) having a slope equal to or greater than a threshold as a passage prohibited region. The planning module 22 determines an element region F(p,q) having a slope less than the threshold as a passage permitted region. Alternatively, the passage prohibited regions may be determined by means of an operation of the input device 12 by the operator.

In step S108, the planning module 22 determines a target travel path and a construction sequence. The target travel path includes a combination of a plurality of travel paths that link the excavation regions and the embankment regions. The travel paths link the representative points of the excavation regions and the representative points of the embankment regions. The planning module 22 determines candidates for which the cost of construction performed by the work machines is the lowest among the plurality of candidates of the travel paths.

The planning module 22 determines travel path candidates while excluding travel paths that pass through the passage prohibited regions. In addition, the planning module 22 determines a plurality of target travel path candidates by taking into consideration changes in the topography of the construction site. For example, the planning module 22 determines the travel path candidates by taking into consideration the fact that a passage prohibited region has been changed to a passage permitted region due to construction by the work machines.

Figure 11:
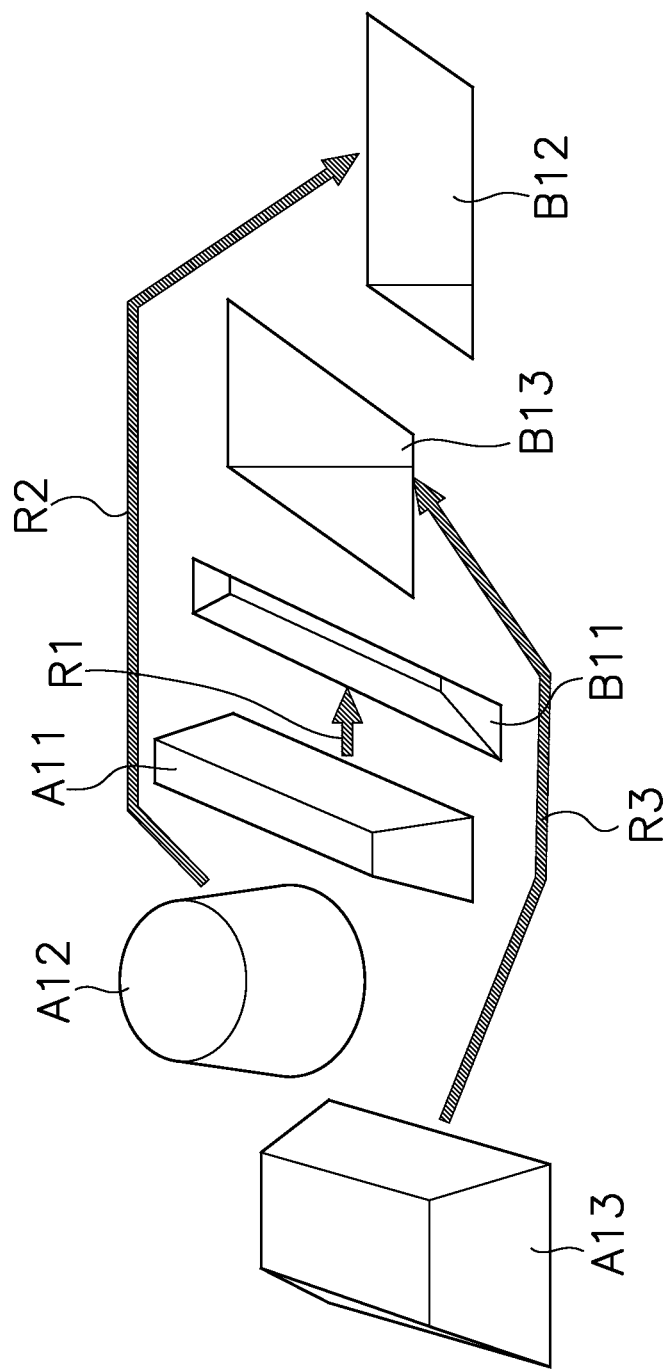
FIG. 11 is a schematic view illustrating a method for determining travel path candidates.
Figure 12:
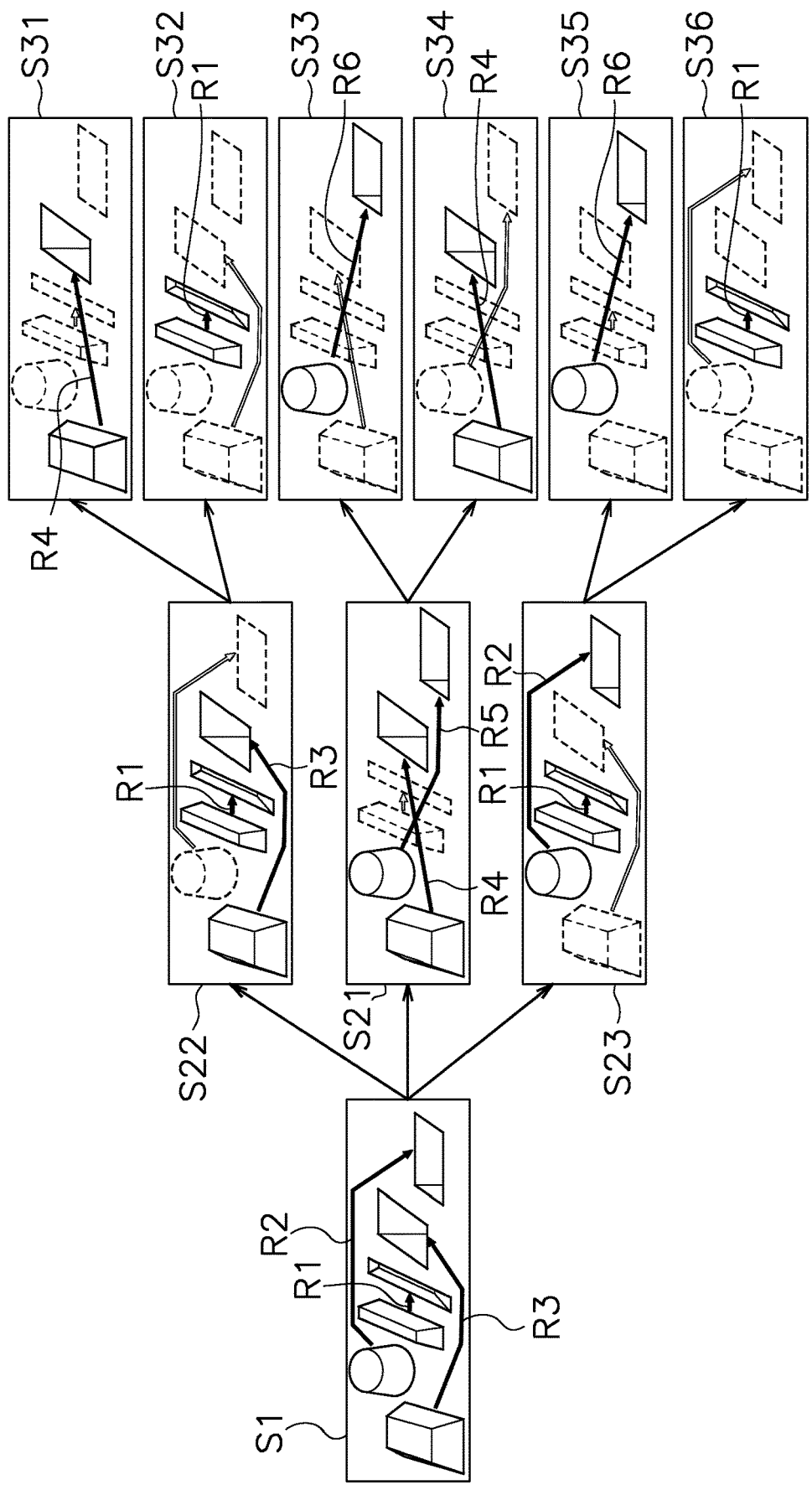
FIG. 12 is a schematic view illustrating a method for determining travel path candidates.

FIGS. 11 and 12 are schematic views illustrating a method for determining travel path candidates. As illustrated in FIG. 11, the actual topography 31 includes, for example, a first excavation region A11, a second excavation region A12, and a third excavation region A13. In addition, the actual topography 31 includes a first embankment region B11, a second embankment region, B12, and a third embankment region B13.

Travel paths that pass through the first excavation region A11, the second excavation region A12, and the third excavation region A13 are determined to be passage prohibited regions due to the slopes of the first excavation region A11, the second excavation region A12, and the third excavation region A13. Travel paths that pass through the first embankment region B11, the second embankment region B12, and the third embankment region B13 are determined to be passage prohibited regions due to the slopes of the first embankment region B11, the second embankment region B12, and the third embankment region B13.

Therefore, the planning module 22 excludes paths that pass through the first excavation region A11, the second excavation region A12, and the third excavation region A13 from the travel path candidates. Moreover, the planning module 22 excludes paths that pass through the first embankment region B11, the second embankment region B12, and the third embankment region B13 from the travel path candidates. As a result, the planning module 22 determines paths R1 to R3 as first travel path candidates as illustrated in FIG. 11.

In FIG. 12, S1 depicts a first target path candidate. S21 depicts a second target path candidate when the path R1 is selected as the first target path. The path R1 depicts a construction pattern in which a work machine performs excavation work at the first excavation region A11 and transports the soil acquired at the first excavation region A11 to the first embankment region B11. S22 depicts a second target path candidate when the path R2 is selected as the first target path. The path R2 depicts a construction pattern in which a work machine performs excavation work at the second excavation region A12 and transports the soil acquired at the second excavation region A12 to the second embankment region B12. S23 depicts the second target path candidate when the path R3 is selected as the first target path. The path R3 depicts a construction pattern in which a work machine performs excavation work at the third excavation region A13 and transports the soil acquired at the third excavation region A13 to the third embankment region B13.

As depicted in S21, when the path R1 is selected as the first target path, the first excavation region A11 is excavated and the first embankment region B11 is filled by the work machine. Therefore, the slopes of the first excavation region A11 and the first embankment region B11 are reduced and the planning module 22 changes the travel path that passes through the first excavation region A11 and the first embankment region B11 from a passage prohibited region to a passage permitted region. As a result, the planning module 22 determines paths R4 and R5 as the second travel path candidates as depicted in S21.

In FIG. 12, S31 to S36 depict third target path candidates that respectively correspond to the second target path candidates S21 to S23. As depicted in S33, when the path R4 is selected as the second target path in S21, the third excavation region A13 is excavated and the third embankment region B13 is filled in by the work machine. Therefore, the slopes of the third excavation region A13 and the third embankment region B13 are reduced and the planning module 22 changes the travel path that passes through the third excavation region A13 and the third embankment region B13 from a passage prohibited region to a passage permitted region. As a result, the planning module 22 determines path R6 as the third travel path candidate as depicted in S33.

In this way, the actual topography of the construction site is changed accompanying the progress of the construction. Consequently, selectable travel paths are also changed according which sequence is being used for performing the construction on the regions of the construction site. The planning module 22 determines the target travel paths and the construction sequence based on the construction cost. For example, the planning module 22 determines combinations of the travel paths and the sequences from S1, S21 to S23, and S31 to S36 so that the construction cost is minimized, and determines the combinations and sequences as the target travel paths and the construction sequence.

As described above, the planning module 22 determines a plurality of travel paths that link the excavation regions and the embankment regions, and determines a combination of travel paths and a sequence for minimizing cost as the target travel paths and the construction sequence. The cost is defined based on the horizontal movement distance, the vertical movement distance, and the transported soil amounts. The horizontal movement distance is the distance in the horizontal direction between adjacent element regions F(p,q). The vertical movement distance is the elevation difference between adjacent element regions F(p,q). By including the horizontal movement distance and the vertical movement distance in the cost, the planning module 22 determines the target travel paths by taking into consideration the ease of passage due to the slopes and the movement distances.

The planning module 22 uses a well-known optimization algorithm or a trained artificial intelligence (AI) model to determine the target travel paths. For example, the planning module 22 uses the A*algorithm to determine the target travel paths for minimizing the cost. In the following equation (1), the cost f(n) is represented in the A*algorithm.

$$f(n) = g1(n) + g2(n) + h(n) \qquad (1)$$

g1(*n*) is the cost corresponding to distance when moving horizontally from a certain element region to the next element region. g2(n) is the cost corresponding to the elevation difference between a certain element region and the next element region. h(n) is an estimated cost until the embankment region that is the goal is reached. The planning module 22 determines a combination of the travel paths so that the cost f(n) is minimized.

In addition, the planning module 22 calculates the soil amounts to be transported on each path so that the amount of work over the entire construction site is optimized. For example, the planning module 22 may determine the soil amounts to be transported so that the sum of the products of the movement distances of the work machines and the soil amounts to be transported is minimized.

Figure 13:
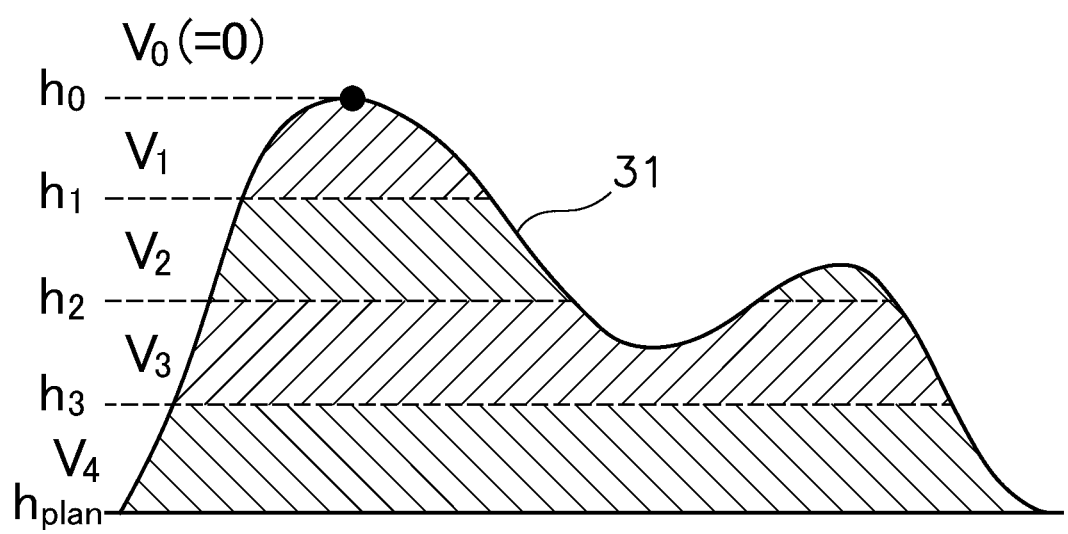
FIG. 13 is a view illustrating a method for calculating the heights of the actual topography that changes due to construction.

When determining the nth target path, the planning module 22 determines the cost g2(n) by taking into consideration changes in the height of the actual topography 31 due to the construction from the first target path to the (n−1)th target path. FIG. 13 is a view illustrating a method for calculating the heights of the actual topography 31 that changes due to the construction by the work machines. In FIG. 13, a cross-section of the actual topography 31 is depicted. The planning module 22 uses the following equation (2) to calculate the height of the actual topography 31 that changes due to the construction by the work machines.

$$h(v) = \frac{h_{i+1} - h_i}{v_{i+1} - v_i}(v - v_{i+1}) + h_{i+1} \quad (2)$$

h(v) is the height of the actual topography 31 that has changed due to the construction by the work machines. $h_{plan}$ is the height of the target topography. $h_i$ is a predetermined horizontal height. $v_i$ is the soil amount from the actual topography height to the predetermined horizontal height $h_i$. v is the soil amount to be excavated or filled in by the work machine.

Figure 14:
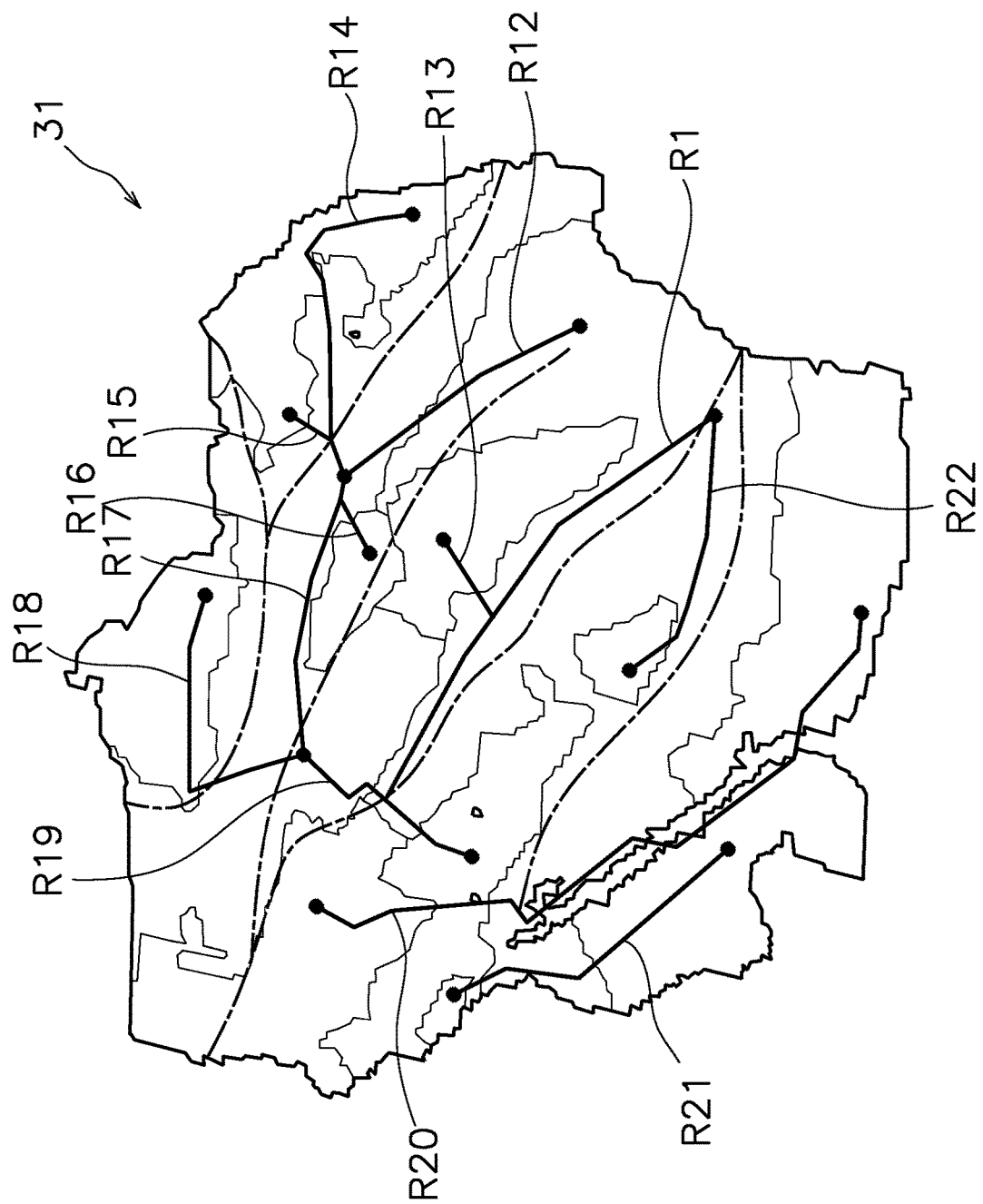
FIG. 14 illustrates an example of target travel paths.

In step S109, the output module 23 outputs a construction plan. For example, the output module 23 displays the target travel paths on the display 13. As illustrated in FIG. 14, the output module 23 displays target travel paths R11 to R22 on the actual topography 31. Alternatively, the output module 23 may also output data representing the target travel paths R11 to R22 to an external computer through the communication network. Alternatively, the output module 23 may also output data representing the target travel paths R11 to R22 to a recording medium.

In the system 1 as in the present embodiment discussed above, the planning module 22 determines, as the construction plan, the target travel paths and the construction sequence that take into account changes in the topography of the construction site. As a result, the system 1 is able to predict changes in the actual topography 31 due to the construction and determine the construction plan. Consequently, a suitable construction plan can be determined for improving the construction efficiency.

Although an embodiment of the present invention has been described so far, the present invention is not limited to the above embodiment and various modifications may be made within the scope of the invention.

The configuration of the system 1 may be modified. For example, the system 1 may include a plurality of computers. Processing performed with the abovementioned system 1 may be distributed among the plurality of computers and executed. The system 1 may include a plurality of processors. The above-mentioned processing may distributed and executed among the plurality of processors.

The above-mentioned sequence of the execution of the processing is not limited to the above embodiment and may be modified. A portion of the above-mentioned processing may be omitted or modified. Processing different from the above-mentioned processing may be added. The determination methods of the excavation regions and the embankment regions are not limited to those of the above embodiment and may be modified. For example, the excavation regions and the embankment regions may be acquired from previously set data.

The system 1 is not limited to using the A*algorithm and may use another path search algorithm, such as Dijkstra's algorithm or the Monte Carlo tree search method. Alternatively, the system 1 may use a trained AI model or an optimization method for determining the target travel paths and the construction sequence. For example, the system 1 may use an AI model developed by reinforcement learning, such as a Deep Q-Network for determining the target travel paths and the construction sequence. The system 1 may determine the construction sequence by adding construction site conditions, such as the ease of moving when moving to the next path. For example, ease of moving is reduced when the movement distance to the next path is large.

Figure 15:
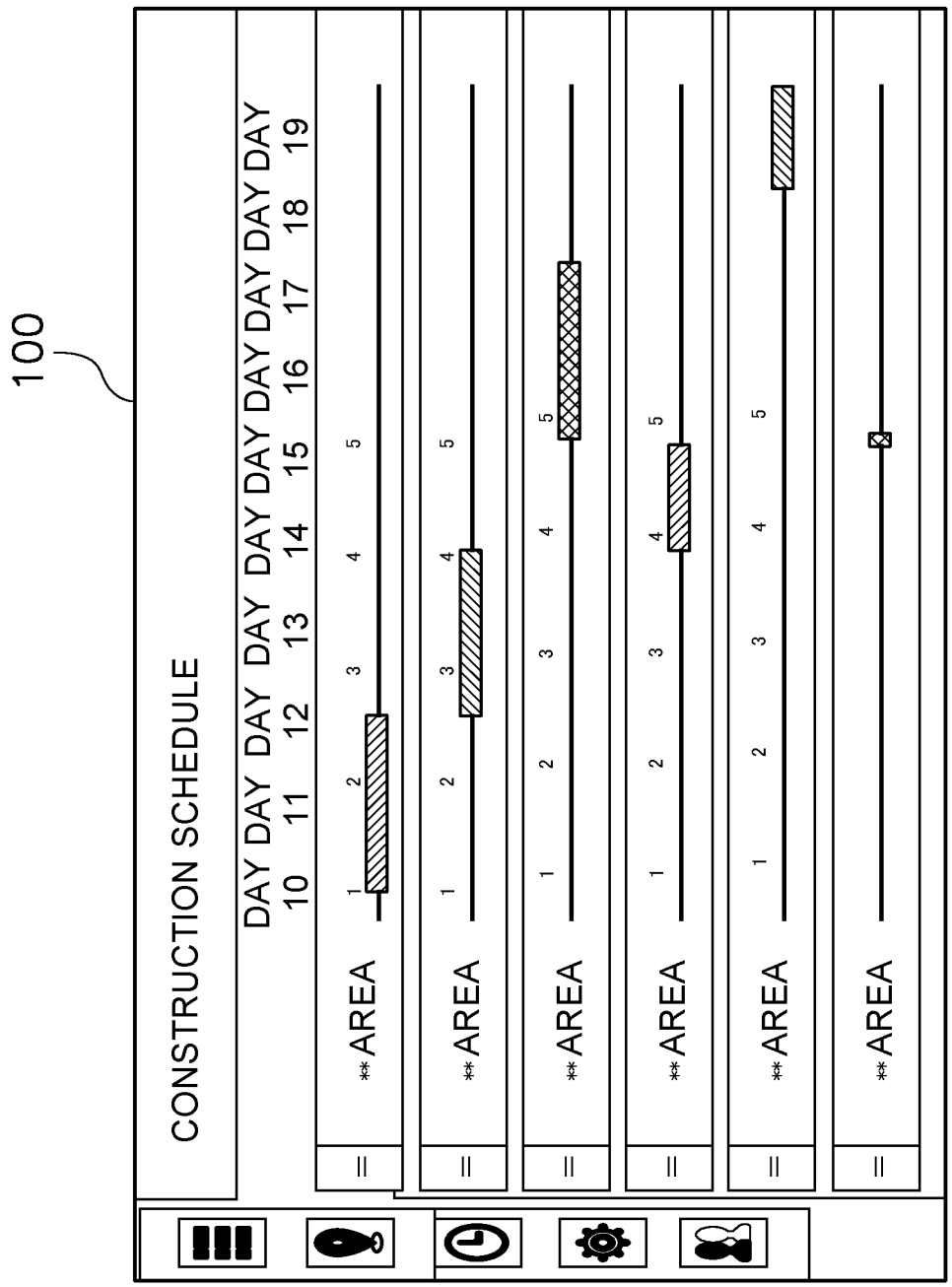
FIG. 15 is a view illustrating an example of a construction schedule.

The system 1 may be used as a construction plan simulator. The system 1 may generate a construction schedule based on the target travel paths. FIG. 15 is a view illustrating an example of a construction schedule 100. For example, the construction schedule 100 depicts regions to be executed, construction times, and a construction sequence. The system 1 may calculate the total travel distance of the work machines and the total soil amount to be transported from the above-mentioned target travel paths. The system 1 may determine the construction times and the construction sequences for each region from the total travel distance, the total soil amount, and construction conditional data.

The system 1 may be used for automatic control of the work machines. The output module 23 may output data indicating the target travel paths to a controller in the work machine. The work machine may be automatically controlled based on the data indicating the target travel paths. For example, the system 1 may automatically control the work machine remotely so that the work machine travels on the target travel paths.

The system 1 may determine starting points and/or ending points of the travel paths as deployment positions of predetermined work machines. For example, the system 1 may remotely automatically control the work machines to be deployed at each of the starting points to move to the starting points. The system 1 may remotely automatically control the work machines to be deployed at each of the ending points to move to the ending points.

According to the system and method as in the present disclosure, a suitable construction plan can be determined for improving construction efficiency.

The invention claimed is:

1. A system for determining a construction plan of a work machine at a work site, the system comprising:
    a computer including a processor configured to
    acquire excavation region data indicative of positions of a plurality of excavation regions at the work site, and embankment region data indicative of positions of a plurality of embankment regions at the work site, the plurality of excavation regions including a first excavation region and a second excavation region and the plurality of embankment regions including a first embankment region and a second embankment region, determine, as the construction plan, a construction sequence and a target travel path including a combination of a plurality of travel paths that link the plurality of excavation regions to the plurality of embankment regions while taking into account a change in a topography of the work site, the plurality of travel paths including a first target path that links the first excavation region to the first embankment region and a second target path that links the second excavation region to the second embankment region, control the work machine automatically such that the work machine travels along the first target path, determine whether each of the first excavation region and the first embankment region has changed from a passage prohibited region to a passage permitted region due to the work by the work machine along the first target path, determine the second target path such that the second target path does not pass through either of the first excavation region and the first embankment region upon determining that neither the first excavation region nor the first embankment region has changed to the passage prohibited region, determine the second target path such that the second target path passes through at least one of the first excavation region or the first embankment region upon determining that the at least one of the first excavation region or the first embankment region has changed to the passage permitted region, and control the work machine automatically such that the work machine travels along the second target path.

2. The system according to claim 1, wherein
the processor further determines the target travel path and the construction sequence while taking into account a change in height of the topography of the work site caused by a work by the work machine.

3. The system according to claim 1, wherein
the processor determines the target travel path and the construction sequence based on a cost defined by a horizontal movement distance, a vertical movement distance, and a transported soil amount of the work machine.

4. The system according to claim 1, wherein
the processor
determines the second target path such that the second target path passes through the first excavation region upon determining that the first excavation region has been changed to the passage permitted region due to the work by the work machine following the first target path.

5. The system according to claim 1, wherein
the processor
determines the second target path such that the second target path passes through the first embankment region upon determining that the first embankment region has been changed to the passage permitted region due to the work by the work machine following the first target path.

6. The system according to claim 1, wherein
the processor acquires actual topography data indicative of an actual topography of the work site,
the actual topography is divided into a plurality of element regions in the actual topography data,
the actual topography data includes heights of the plurality of element regions, and
the processor determines the target travel path and the construction sequence based on distances of the travel paths and differences between the heights of element regions among the plurality of element regions included in the travel paths.

7. The system according to claim 6, wherein
the processor
acquires target topography data indicative of a target topography of the work site,
designates each element region among the plurality of element regions in which the actual topography is higher than the target topography as an excavation attribute,
designates each element region among the plurality of element regions in which the actual topography is lower than the target topography as an embankment attribute, and
designates each element region among the plurality of element regions in which the actual topography is the same as the target topography as a border attribute.

8. The system according to claim 7, wherein
the processor
groups element regions among the plurality of element regions that are adjacent to each other and have the excavation attribute as one of the plurality of excavation regions, and
groups element regions among the plurality of element regions that are adjacent to each other and have the embankment attribute as one of the embankment regions.

9. The system according to claim 8, further comprising an input device that receives an operation by an operator,
the processor dividing the excavation regions or the embankment regions in response to the operation of the input device.

10. A method implemented into a computer for determining a construction plan of a work machine at a work site, the method comprising:
acquiring excavation region data indicative of positions of a plurality of excavation regions at the work site, the plurality of excavation regions including a first excavation region and a second excavation region;
acquiring embankment region data indicative of positions of a plurality of embankment regions at the work site, the plurality of embankment regions including a first embankment region and a second embankment region;
determining, as the construction plan, a construction sequence and a target travel path including a combination of a plurality of travel paths that link the plurality of excavation regions to the plurality of embankment regions while taking into account a change in a topography of the work site, the plurality of travel paths including a first target path that links the first excavation region to the first embankment region and a second target path that links the second excavation region to the second embankment region;
controlling the work machine automatically such that the work machine travels along the first target path;
determining whether each of the first excavation region and the first embankment region has changed from a passage prohibited region to a passage permitted region due to the work by the work machine along the first target path;
determining the second target path such that the second target path does not pass through either of the first excavation region and the first embankment region upon determining that neither the first excavation region nor the first embankment region has changed to the passage prohibited region;

determining the second target path such that the second target path passes through at least one of the first excavation region or the first embankment region upon determining that the at least one of the first excavation region or the first embankment region has changed to the passage permitted region; and controlling the work machine automatically such that the work machine travels along the second target path.

11. The method according to claim 10, wherein
the change in the topography of the work site includes a change in height of the topography of the work site due to a work by the work machine.

12. The method according to claim 10, wherein
the target travel path and the construction sequence are determined based on a cost defined by a horizontal movement distance, a vertical movement distance, and a transported soil amount of the work machine.

13. The method according to claim 10, wherein
the method further comprises
determining the second target path such that the second target path passes through the first excavation region upon determining that the first excavation region has been changed to the passage permitted region due to the work by the work machine following the first target path.

14. The method according to claim 10, wherein
the method further comprises
determining the second target path such that the second target path passes through the first embankment region upon determining that the first embankment region has been changed to the passage permitted region due to the work by the work machine following the first target path.

15. The method according to claim 10, further comprising
acquiring actual topography data indicative of an actual topography of the work site,
the actual topography being divided into a plurality of element regions in the actual topography data,
the actual topography data including heights of the plurality of element regions, and
the method further comprising determining the target travel path and the construction sequence based on distances of the travel paths and differences between the heights of element regions among the plurality of element regions included in the travel paths.

16. The method according to claim 15, further comprising
acquiring target topography data indicative of a target topography of the construction site;
designating each element region among the plurality of element regions in which the actual topography is higher than the target topography as an excavation attribute;
designating each element region among the plurality of element regions in which the actual topography is lower than the target topography as an embankment attribute; and
designating each element region among the plurality of element regions in which the actual topography is the same as the target topography as a border attribute.

17. The method according to claim 16, further comprising
grouping element regions among the plurality of element regions that are adjacent to each other and have the excavation attribute as one of the excavation regions; and
grouping element regions among the plurality of element regions that are adjacent to each other and have the embankment attribute as one of the embankment regions.

18. The method according to claim 17, further comprising
receiving a signal from an input device, the signal indicating an operation by an operator; and
dividing the excavation regions or the embankment regions in response to the operation of the input device.

19. The system according to claim 1, wherein
the processor further determines whether each of the first excavation region and the first embankment region is the passage prohibited region or the passage permitted region based on a slope of the first excavation region and a slope of the first embankment region.

20. The method according to claim 10, wherein
the determining whether each of the first excavation region and the first embankment region is the passage prohibited region or the passage permitted region is based on a slope of the first excavation region and a slope of the first embankment region.

\* \* \* \* \*